5

4 Sheets. Sheet 1.

R. Dutton,
Mower.

Orig. 31,378
No. 4124.

Reissued Sept. 20. 1870.

Fig. 1

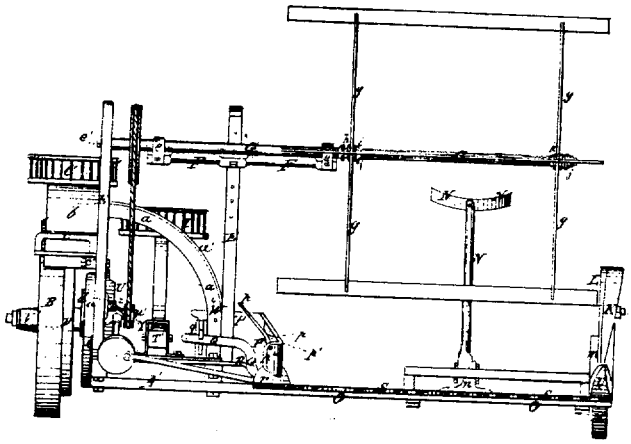

Fig. 2

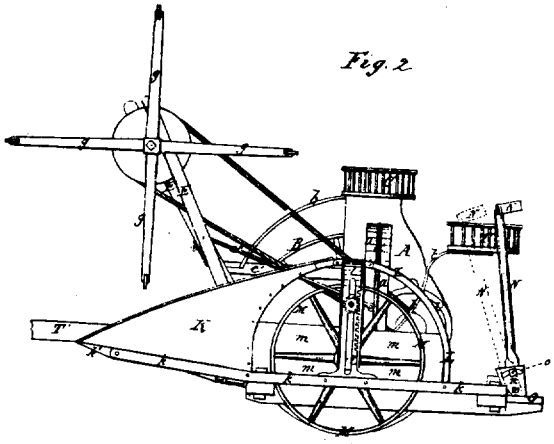

4,124. — Division A.—HARVESTER.—Rufus Dutton, Yonkers, N. Y. — Patent No. 31,378, dated February 12, 1861.

*Claim.*—1. The combination of a main frame, A′, with upright and curved standards A *a*, to support the gearing above the frame, and provided with journal-bearings for the alternate main axle V, as and for the purpose described.

2. The combination of an alternate main axle, V, and auxiliary driving-wheel B′, with a main frame, A′, and main driving-wheel B, as and for the purpose described.

3. The combination of a reel-bearing arm, F, with two reel-standards, E, for three journal-bearings for an overhanging reel, as and for the purpose described.

4 Sheets. Sheet. 2.
R. Dutton,
Mower.
Orig. 31,378
No 4124.
Reissued, Sept 20. 1870
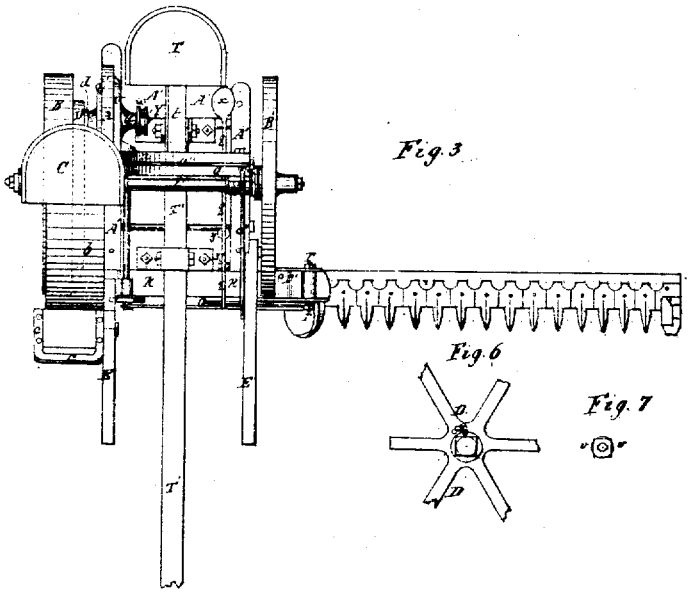
Fig. 3
Fig. 6
Fig. 7
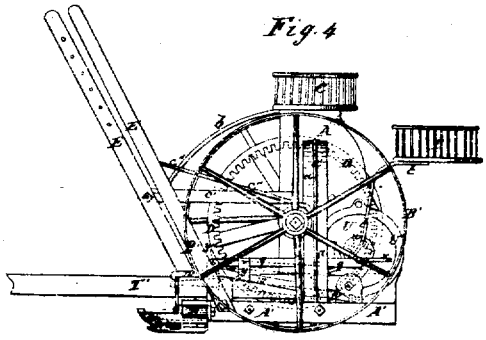
Fig. 4
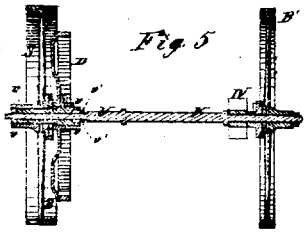
Fig. 5

5

4 Sheets. Sheet 3.

R. Dutton,

Mower.

Orig. 31,378
No 4124.

Reissued Sept. 20 1870

5

4 Sheets. Sheet 4.

R. Dutton,

Mower.

Pat. Aug. 31, 1858.
No. 4124.

Reissued. Sept. 20. 1870.

Rufus Dutton,
By James Dempsey,
Agent.

J. A. Lubascher
J. F. C. Prescott
Witnesses.

United States Patent Office.

RUFUS DUTTON, OF YONKERS, NEW YORK.

*Letters Patent No.* 31,378, *dated February* 12, 1861; *reissue No.* 4,124, *dated September* 20, 1870.

DIVISION A.

IMPROVEMENT IN HARVESTERS.

The Schedule referred to in these Letters Patent and making part of the same

*To all persons whom it may concern:*

I, RUFUS DUTTON, formerly of Dayton, Ohio, and now of Yonkers, New York, have invented Improvements in Mowing and Reaping-Machines.

The accompanying drawing and following description, with the specifying letters thereof, fully illustrate the invention.

A combined machine, in both its forms, as a mower and as a reaper, and various detached parts thereof, embodying the invention, are represented in the drawing, of which—

Figure 1 represents a front view of the machine in its form as a reaper.

Figure 2 represents an end view of the machine in its form as a reaper.

Figure 3 represents a top view of the machine in its form as a mower.

Figure 4 represents an end view of the machine in its form as a mower.

Figure 5 represents a sectional view of the driving-wheels and long main axle.

Figure 6 represents an end view of the center of the main gear-wheel.

Figure 7 represents an end view of the sleeve-axle.

Figure 8:
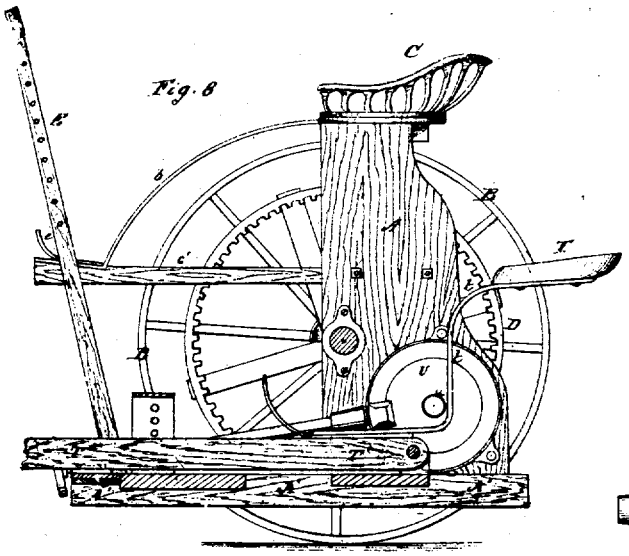
Figure 8 represents, from the left, a sectional view of the machine cut by a plane between the draft-tongue and auxiliary driving-wheel at the place of the dotted line $x^2$.
Figure 9:
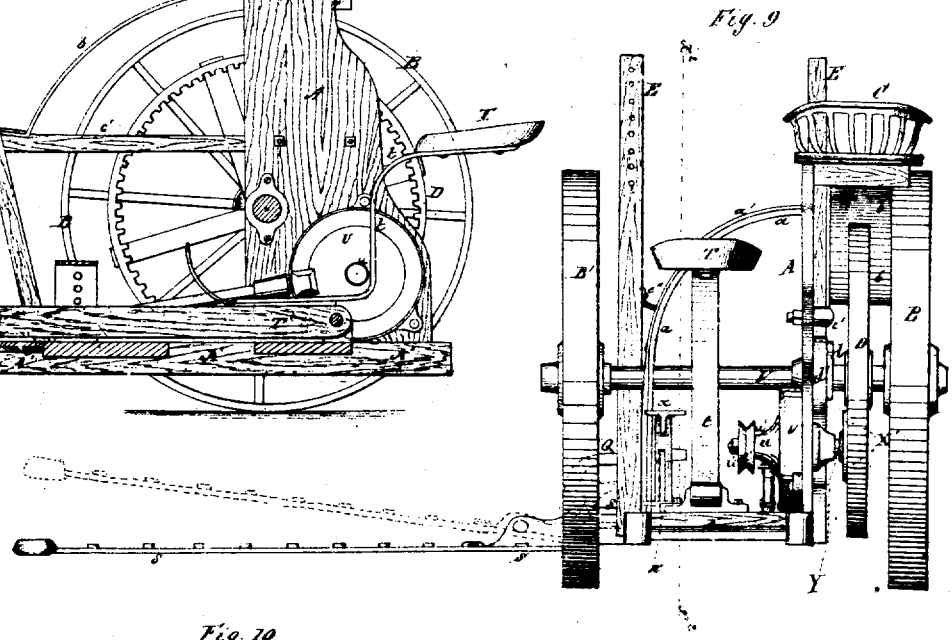
Figure 9 represents a rear view of the machine in its form as a mower.
Figure 10:
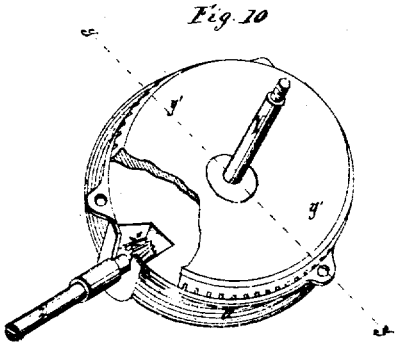
Figure 10 represents a perspective view of the bevel-gear wheels within the hollow part of the inclosing box or case.
Figure 11:
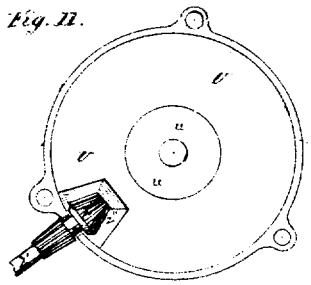
Figure 11 represents a view of the inside of the hollow part of the inclosing box or case with the small bevel-gear wheel therein.
Figure 14:
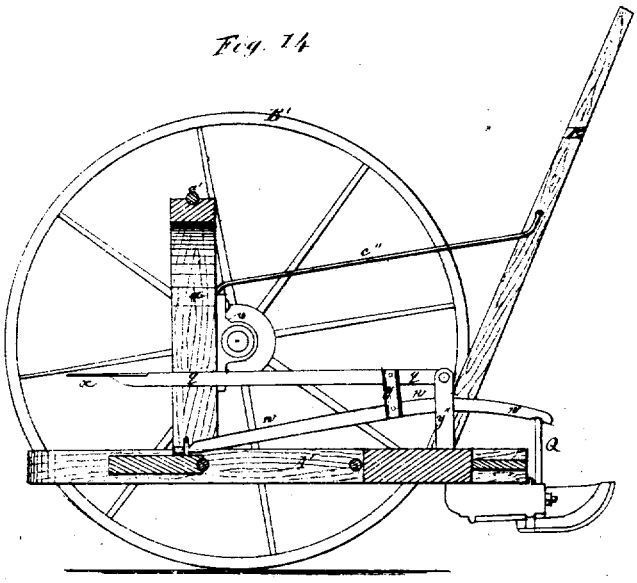
Figure 14 represents, from the right, a sectional view of the machine cut by a plane between the draft-tongue and auxiliary driving-wheel at the place of the dotted line $x^2$.

The drawing represents the whole invention and all the separate parts thereof. It also represents many things common to all kindred machines, but necessary to develop the invention; and it also represents many other common things, which may be used or not, and the description explains all the devices represented in the drawing; but the application of this division is only for that part of the invention not included in the other divisions, and which is claimed in the summary of this specification; and The nature of that part of the invention, exclusively included in this division, is as follows:

First, combining a main frame with two standards, one upright and the other curved, which project above it, and which curved standard acts as a brace to the other, and which standards receive and hold the journal-bearings for a main axle.

Second, combining an alternate main axle and auxiliary driving-wheel with the main driving-wheel, to give more power to the cutters when mowing.

Third, combining a journal-bearing arm with two reel standards, to give three journal-bearings to the axle of an overhanging reel, when reaping.

The description is as follows:

A′ represents a common main frame, of four sills, in an oblong square form.

A represents an upright standard or wide plank, attached to a long sill of the main frame A′, the wide way of the plank parallel with the long way of the frame.

*a* represents a curved brace-standard, attached to the upper part of the wide plank A, and to the opposite long sill of the main frame A′.

*a′* represents a fastening-rod through the upright standard A, along in a groove in the upper side of the brace-standard *a*, and through the main frame sill, to hold the upright firmly against the brace, and the brace to the main frame A′.

B represents a main driving-wheel, attached to the main frame A′ in a twofold way; in one way when reaping, on a short main axle, on one end of which is spur-pinion, which meshes into a cog-rack within a curved slot in a segment-plate attached to the upright standard A, which arrangement of driving-wheel, short axle, spur-pinion, cog-rack, segment-plate, and upright standard is fully described in my patent of April 27, 1858; and, in another way, when moving, on an alternate or long main axle, through journal-bearings attached to the upright and curved standards A *a* above the main frame A′.

B′ represents an auxiliary driving-wheel, when mowing, on a long main axle, at the side of the main frame A′, opposite to the main driving-wheel B.

*b* represents a curved shield over the main driving-wheel B, and fastened to the wide plank A.

C represents an operating seat, for reaping, over the main driving-wheel B, and attached to the wide plank A and curved shield *b*.

*c* represents an operator's foot-rest at the bottom of the curved shield *b*.

D represents an overhanging annular internal main gear-wheel, on the main axle, between the wide standard A and the main driving-wheel B.

E represents a reel-standard, projecting upward from each side of the fore part of the main frame A.

*c'* represents a brace-rod, from the wide standard A to the outer reel-standard E.

*c''* represents another brace-rod, from the curved standard *a* to the inner reel-standard E.

*d* represents a flange on the short main axle, to brace the axle at a right angle to the wide plank A.

*d'* represents a curve cog-slotted segment-plate, attached to the outer side of the wide standard A.

F represents a reel-supporting arm, parallel with the main axle, and bolted to one of a series of adjusting holes through the inner reel-standard E.

*e* represents a journal-bearing for a reel-axle, on each end of the reel-supporting arm F.

*e'* represents a sleeve for a reel-axle journal-bearing, in one of a series of adjusting holes in the outer reel-standard E.

G represents a reel-axle, resting in the journal-bearings *e e'* of the supporting-arm F and outer reel-standard E, and overhanging the cutters.

*g* represents a series of reel-spokes on the reel-axle G, nearly over each end of the cutters.

*h* represents a flange-plate on the reel-axle G, at the outer side of each series of reel-spokes *g*, in which flange-plates, on the inner sides, are grooves or sockets to receive and hold the outer sides of the outer reel-spokes.

*j* represents another flange-plate on the reel-axle G, at the inner side of each series of reel-spokes *g*, and similar to the first flange-plate *h*, to receive and hold the outer sides of the inner reel-spokes.

Between each two flange-plates, *h j*, on the reel-axle G, is another similar flange-plate, grooved on each side, to receive and hold the inner sides of each series of reel-spokes *g*.

*i* represents a pin through the reel-axle G, next to the second flange *j*, adjacent to a journal-bearing, *e*, to fasten together, in reel order, one series of flanges, *h j*, and spokes *g*, the first flange, *h*, of which rests against a shoulder on the reel-axle next to the contiguous journal-bearing, and the other series of flanges and spokes is fastened, in reel order, by pressure against another pin or shoulder in or on the reel-axle by a screw-nut on the overhanging end of the axle, which arrangement of socket-flanges and fastenings on the reel-axle will hold the spokes, with the blades thereon, in reel-order, when reaping, and will allow them to be folded when not in use.

K represents a blade, projecting forward of the cutters, at a right angle thereto, from the outer side of the grain-platform, to divide the grain to be cut from that left standing.

*k* represents a cross-sill under the outer side of the grain-platform, projecting under the grain-divider K, and bent upward forward of the cutters.

*k'* represents a metal point on the combined end of the grain-divider and cross-sill K *k*.

L represents another curved shield over the outer side of the grain-platform, behind the grain-divider K, and attached to the cross-sill *k*.

M represents a small carrying-wheel, attached to the grain-platform, under the second curved shield L.

*l* represents a slotted upright standard for the axle of the small carrying-wheel M at the outer side of the grain-platform, and attached to the cross-sill *k* and carrying-wheel shield L, nearly in the plane of the curved brace-standard *a*, in the slot of which upright standard is a hanger, which may slide up and down in the slot, and in the bottom of which hanger is a journal-bearing for the small carrying-wheel axle, and to the upper part of which hanger, in one of a series of adjusting-holes, is attached the axle of a spur-pinion, which reaches through and meshes into a cog-rack, at the fore or hind side of the slot, on the outer side of the standard, which arrangement of small carrying-wheel, axle-hanger, spur-pinion, cog-rack, and slotted standard is a modification of my patent of April 27, 1858; and by this and the similar arrangement of the main driving-wheel and its attachments, when reaping, the main frame, grain-platform, and cutters can be set at any desired distance from the ground.

*m* represents a shield-blade, across the grain-platform, next to the small carrying-wheel M, to prevent the cut grain from contact with the wheel.

N represents a breast-rest, on the hind side of the grain-platform, for the raking-operator.

*n* represents a vertical brace-plate on the grain-platform, at a right angle to the cutters, to which the rest N is pivoted.

*o* represents a curved slot in the brace-plate *n*, through which slot and the rest-standard N, above the pivot, is a set-screw bolt, to fasten the breast-rest more or less forward, as short or long grain is cut.

O represents a grain-platform, attached to the main frame A' and behind the cutters when reaping.

P represents another shield-blade across the grain-platform O, next to the main frame A' to prevent the cut grain from contact with the frame.

*p* represents a gathering-rod, attached to the fore part of the second shield-blade P, and curved upward and bent backward across the grain-platform O, to assist in gathering all grain-straws onto the platform.

*p'* represents a narrow place in the second shield-blade P, over the cutters, to allow the reel to drop lower for short grain.

*p''* represents a gathering-end of the second shield-blade P, forward of the cutters, similar to the grain-divider K, and bent toward the draft-tongue.

Q represents a lever, attached to the finger-bar, or to the finger-bar shoe, between the pivot and the main frame A', and bent upward and over the frame.

*w* represents another lever, pivoted to the hind end of the main frame A', and extended forward and laid on the first lever Q.

*y* represents a slotted fulcrum, on the upper side and between the ends of the second lever *w*.

*y''* represents a slotted lever-post on the main frame A', between the fulcrum *y* on the second lever *w* and the first lever Q, through which slotted post the second lever works.

*q* represents another lever, pivoted to the lever-post *y''*, and extended over the second lever *w*, through the slot of the fulcrum *y*, to the hind part of the main frame A'.

*x* represents an operating foot-tread on the hind end of the third lever *q*, which arrangement of combined levers with the main frame, finger-bar, and operating-seat will allow the outer end of the finger-bar, when mowing, to be raised and lowered by a pressure of the foot.

R represents a connecting bar, rigidly attached to the fore part of the main frame A'.

S represents a finger-bar, attached to the connecting-bar R, near a fore corner of the main frame A', on the side opposite to the main driving-wheel B, and parallel with the main axle.

*r* represents a horizontal pivot-pin, by which the finger-bar S is hinged to the connecting-bar R.

*r'* represents a vertical screw-bolt, through the connecting-bar R and finger-bar S, between the pivot *r* and the main frame A', which arrangement of bolt and pivot will allow the finger-bar to be rigid when reaping, and flexible when mowing—rigid with the bolt, and flexible without it.

T' represents a draft-tongue, hinged to the hind part of the main frame A', between the driving-wheels B B', when mowing, and additionally attached when reaping, by a bolt through one of a series of adjusting-holes in a slotted standard on the fore part of the frame.

T represents an operator's seat, when mowing, on the hind end of the draft-tongue T'.

*t* represents a spring, by which the mowing-seat T is attached to the draft-tongue T'.

U represents a metal casing, or a hollow shell-like metal plate, fastened against the wide plank or flat plate A, on the side opposite to the main driving-wheel B, which hollow plate U, combined with the flat plate or standard A, make a tight box or case, which incloses and protects the secondary gear-wheels.

*u* represents a tubular prolongation of the hollow of the shell-like plate U, to support a journal of a secondary gear-wheel axle, which arrangement makes the hollow plate U *u* both an inclosing casing and a support for a journal of a secondary gear-wheel axle.

V' represents a short main axle, attached to the segment-plate *d'* of the wide standard A, for the main driving-wheel B, when reaping.

V represents an alternate or long main axle in journal-bearings, attached to the wide upright standard A and curved brace-standard *a*, for the main and auxiliary driving-wheels B B'.

W represents a journal-bearing, attached to the curved brace-standard *a* for the inner journal of the long main axle V, when mowing.

X represents a main spur-pinion gear-wheel for reaping, which meshes into the main gear-wheel D, and is on the outer end of the secondary gear-wheel axle Y.

Y represents an axle, parallel with the main axle V or V', and through the inclosing casings A U for secondary gear-wheels.

Z represents a journal-bearing, attached to the wide upright standard A for the outer journal of the long main axle V, when mowing.

*u'* represents a pulley, on the inner end of the secondary gear-wheel axle Y, for a reel-chain, when reaping.

*v* represents a sleeve-axle, outwardly somewhat similar to the short main axle V', over one end of the long main axle V, and within the main driving-wheel B and main gear-wheel D, in the end of which sleeve-axle, next to the main frame A', are radial slots, from the sleeve-hole outward, as shown in fig. 7, and which end of the sleeve-axle is square, and fits in a square hole or recess in the hub of the main gear-wheel, as shown in fig. 6.

*v'* represents pins in the long main axle V, and in the slots of the sleeve-axle *v*, which arrangement of pins and slots, and square axle-end and square hub-hole, attaches the main gear-wheel rigidly to the sleeve-axle, and the sleeve-axle rigidly to the long main axle.

X' represents an alternate main spur-pinion gear-wheel, smaller than, and to be used in place of, the reaping spur-pinion X, as shown in fig. 4, to increase the motion of the cutters, when mowing.

Figure 12:
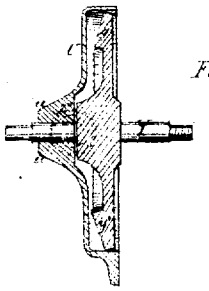
Figure 12 represents a vertical sectional view of the hollow part of the inclosing box or case with the large bevel-gear wheel therein.
Figure 16:
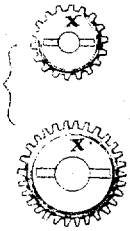
Figure 16 represents a side view of each of the two alternate main spur pinion gear-wheels.
Figure 13:
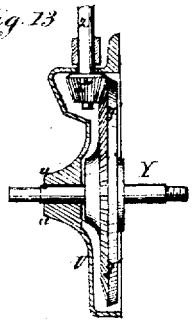
Figure 13 represents a lateral sectional view of the hollow part of the inclosing box or case with the large bevel-gear wheel therein.
Figure 15:
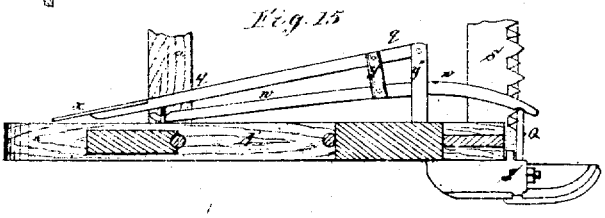
Figure 15 represents a side view of the combined levers, pressed down, and the outer end of the finger-bar and cutters, raised up.

*y'* represents a large bevel-gear wheel on the secondary gear-wheel axle Y, and within the inclosing box or case A U, as shown in figs. 12 and 13.

*z'* represents a crank-wheel axle, parallel with the long way of the main frame A', and in journal-bearings on the fore end of the frame, and in another journal-bearing attached to the flat plate A.

*z''* represents a bevel-pinion gear-wheel, which meshes into the large bevel-gear wheel *y'*, within the inclosing box or case A U, and is on the hind end of the crank-wheel axle *z'*, and in a dip or pocket of the hollow plate U.

In the hub of the main gear-wheel D, next to the main driving-wheel B, is a recess, in the perimeter of which is a series of ratchet-teeth, and on the hub of the main driving-wheel, next to the main gear-wheel, is a ratchet, which hub and ratchet fit into the recess and ratchet-teeth of the gear-wheel, and which ratchet and teeth are so arranged that the driving-wheel will clutch and drive the gear-wheel when moving forward, but not when moving backward.

In a similar way the auxiliary driving-wheel B' is coupled with a ratchet-plate on the long main axle V, so that the driving-wheel, when moving forward, will clutch and drive the axle, and also the axle-sleeve *v* and the main gear-wheel D, attached to the axle, but not when moving backward.

In this way the carrying-wheels B B' are both driving-wheels, and work together, when moving forward, but independently when either moves backward, and thus the auxiliary driving-wheel adds power in driving the cutters.

A hollow, integral, metal-casing plate, U, separate from any of the driving or carrying-wheels B B' M, which plate makes a main side or part of a box or case, which incloses the secondary gear-wheels *y z''*, and protects them from all impeding or injuring substances, and which plate also supports the journals of one side of such inclosed gear-wheels; and a box or case, made of only two main casing plates A U, separate from any driving or carrying-wheel, which box or case incloses and protects the secondary gear-wheels, are not a part of this division of the invention, but are the subjects of another division, and of an application for a separate patent therefor.

The following is a summary of what is included in this division of the invention, and for which I desire a separate patent:

1. The combination of a main frame, A', with upright and curved standards A *a*, to support the gearing above the frame, and provided with journal-bearings for the alternate main axle V, as and for the purpose described.

2. The combination of an alternate main axle, V, and auxiliary driving-wheel B', with a main frame, A', and main driving-wheel B, as and for the purpose described.

3. The combination of a reel-bearing arm, F, with two reel-standards, E, for three journal-bearings for an overhanging reel, as and for the purpose described.

RUFUS DUTTON.

Witnesses:
JAMES DENSMORE,
T. G. CLAYTON.